US012542082B2

(12) United States Patent
Lim et al.

(10) Patent No.: US 12,542,082 B2
(45) Date of Patent: Feb. 3, 2026

(54) DISPLAY APPARATUS AND METHOD OF DRIVING DISPLAY PANEL USING THE SAME

(71) Applicant: Samsung Display Co., LTD., Yongin-si (KR)

(72) Inventors: Hyunho Lim, Yongin-si (KR); Yoosung Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/825,650

(22) Filed: Sep. 5, 2024

(65) Prior Publication Data

US 2025/0104591 A1 Mar. 27, 2025

(30) Foreign Application Priority Data

Sep. 27, 2023 (KR) ........................ 10-2023-0130329

(51) Int. Cl.
*G09G 3/20* (2006.01)

(52) U.S. Cl.
CPC ... *G09G 3/2007* (2013.01); *G09G 2320/0673* (2013.01); *G09G 2330/021* (2013.01)

(58) Field of Classification Search
CPC ......... G09G 3/2007; G09G 2320/0673; G09G 2330/021; G09G 3/3696; G09G 3/3275; G09G 2310/0291; G09G 2320/0276
See application file for complete search history.

(56) References Cited

U.S. PATENT DOCUMENTS

| | | | | |
|---|---|---|---|---|
| 5,828,330 A * | 10/1998 | Benzel | H03M 1/367 341/159 |
| 9,818,367 B2 | 11/2017 | Lin et al. | |
| 12,020,665 B2 * | 6/2024 | Shigeta | G09G 3/3696 |
| 2016/0343292 A1 | 11/2016 | Zheng et al. | |
| 2020/0234624 A1 * | 7/2020 | Lim | G09G 3/20 |

FOREIGN PATENT DOCUMENTS

| | | |
|---|---|---|
| KR | 10-2020-0091527 A | 7/2020 |
| KR | 10-2020-0115935 A | 10/2020 |

* cited by examiner

*Primary Examiner* — Antonio Xavier
(74) *Attorney, Agent, or Firm* — Womble Bond Dickinson (US) LLP

(57) ABSTRACT

A display apparatus includes: a display panel including a pixel and configured to display an image based on input image data; a gate driver configured to output a gate signal to the pixel; a data driver configured to output a data voltage to the pixel; and a gamma reference voltage generator including a gamma bias circuit configured to generate a bias current based on a gamma voltage range which is from a voltage level corresponding to a zero grayscale to a voltage level corresponding to a setting luminance and a gamma amplifying circuit configured to receive the bias current, the gamma reference voltage generator being configured to generate gamma reference voltages and to output the gamma reference voltages to the data driver.

19 Claims, 10 Drawing Sheets

FIG. 4

| VGRG | GBC |
|---|---|
| RG1 | GBC1 |
| RG2 | GBC2 |
| RG3 | GBC3 |
| RG4 | GBC4 |
| RG5 | GBC5 |
| RG6 | GBC6 |
| RG7 | GBC7 |
| RG8 | GBC8 |

FIG. 5

| GBC | GBIC |
|---|---|
| GBC1 | 111 |
| GBC2 | 110 |
| GBC3 | 101 |
| GBC4 | 100 |
| GBC5 | 011 |
| GBC6 | 010 |
| GBC7 | 001 |
| GBC8 | 000 |

FIG. 6

| GBIC | BI |
|---|---|
| 111 | 137.5% |
| 110 | 125% |
| 101 | 112.5% |
| 100 | 100% |
| 011 | 87.5% |
| 010 | 75% |
| 001 | 62.5% |
| 000 | 50% |

DISPLAY APPARATUS AND METHOD OF DRIVING DISPLAY PANEL USING THE SAME

CROSS-REFERENCE TO RELATED APPLICATION

The present application claims priority to and the benefit of Korean Patent Application No. 10-2023-0130329, filed on Sep. 27, 2023, in the Korean Intellectual Property Office, the entire disclosure of which is incorporated herein by reference.

BACKGROUND

1. Field

Aspects of some embodiments of the present disclosure relate to a display apparatus and a method of driving a display panel using the display apparatus.

2. Description of the Related Art

Generally, a display apparatus includes a display panel and a display panel driver. The display panel includes a plurality of gate lines, a plurality of data lines and a plurality of pixels. The display panel driver includes a gate driver providing a gate signal to the gate lines, a gamma reference voltage generator providing a gamma reference voltage to a data driver, the data driver providing a data voltage to the data lines and a driving controller controlling the gate driver and the data driver.

The gamma reference voltage generator may include a plurality of gamma amplifiers. When a bias current of the gamma amplifier is set low, a display quality may deteriorate due to insufficient pixel charge. In contrast, when a bias current of the gamma amplifier is set high, a power consumption may increase.

The above information disclosed in this Background section is only for enhancement of understanding of the background and therefore the information discussed in this Background section does not necessarily constitute prior art.

SUMMARY

Aspects of some embodiments of the present disclosure relate to a display apparatus and a method of driving a display panel using the display apparatus. For example, aspects of some embodiments of the present disclosure relate to a display apparatus including a plurality of gamma amplifiers having different bias currents and a method of driving a display panel using the display apparatus.

Aspects of some embodiments of the present disclosure include a display apparatus that may be capable of reducing a power consumption by setting a bias current of a plurality of gamma amplifiers appropriately.

Aspects of some embodiments of the present disclosure also include a method of driving a display panel using the display apparatus.

According to some embodiments of the present disclosure, a display apparatus includes a display panel, a gate driver, a data driver and a gamma reference voltage generator. According to some embodiments, the display panel includes a pixel and displays an image based on input image data. According to some embodiments, the gate driver outputs a gate signal to the pixel. According to some embodiments, the data driver outputs a data voltage to the pixel. According to some embodiments, the gamma reference voltage generator includes a gamma bias circuit generating a bias current based on a gamma voltage range in which ranges from a voltage level corresponding to a zero grayscale to a voltage level corresponding to a setting luminance and a gamma amplifying circuit receiving the bias current. According to some embodiments, the gamma reference voltage generator generates gamma reference voltages and outputs the gamma reference voltages to the data driver.

According to some embodiments, based on the voltage level corresponding to the setting luminance of the gamma voltage range being higher than a voltage level of a reference luminance, a first bias current may be applied to the gamma amplifying circuit.

According to some embodiments, based on the voltage level corresponding to the setting luminance of the gamma voltage range being lower than the voltage level of the reference luminance, a second bias current lower than the first bias current may be applied to the gamma amplifying circuit.

According to some embodiments, based on the voltage level corresponding to the setting luminance of the gamma voltage range being a voltage level of maximum luminance, a third bias current higher than the first bias current may be applied to the gamma amplifying circuit.

According to some embodiments, the bias current may be updated on frame by frame.

According to some embodiments, based on the gamma voltage range of a present frame being wider than the gamma voltage range of a previous frame, the bias current of the present frame may be higher than the bias current of the previous frame.

According to some embodiments, based on the gamma voltage range of a present frame being narrower than the gamma voltage range of a previous frame, the bias current of the present frame may be lower than the bias current of the previous frame.

According to some embodiments, the gamma reference voltage generator may further include a gamma voltage setting circuit outputting a high gamma reference voltage and a low gamma reference voltage based on the input image data. According to some embodiments, the gamma bias circuit may include a gamma bias setting circuit outputting a gamma bias code based on the gamma voltage range, a gamma bias controlling circuit receiving the gamma bias code and outputting a gamma bias current code based on the gamma bias code and a bias current outputting circuit receiving the gamma bias current code and outputting a bias current based on the gamma bias current code.

According to some embodiments, the low gamma reference voltage may be generated based on the setting luminance.

According to some embodiments, the gamma amplifying circuit may include a first gamma amplifier and a second gamma amplifier. According to some embodiments, the gamma bias circuit may include a first gamma bias circuit and a second gamma bias circuit. According to some embodiments, a first amp bias current generated by the first gamma bias circuit may be applied to the first gamma amplifier. According to some embodiments, a second amp bias current generated by the second gamma bias circuit may be applied to the second gamma amplifier. According to some embodiments, the first amp bias current and the second amp bias current are different.

According to some embodiments, the gamma amplifying circuit may include a first gamma amplifier and a second gamma amplifier. According to some embodiments, the gamma bias circuit may include a first gamma bias circuit and a second gamma bias circuit. According to some embodiments, a first amp bias current generated based on the setting luminance and the gamma voltage range may be applied to the first gamma amplifier. According to some embodiments, a second amp bias current generated based on the setting luminance and the gamma voltage range may be applied to the second gamma amplifier. According to some embodiments, the first amp bias current and the second amp bias current are different.

According to some embodiments, the gamma reference voltage generator may include a first gamma amplifying circuit generating first gamma reference voltages corresponding to an image of a first color, a second gamma amplifying circuit generating second gamma reference voltages corresponding to an image of a second color and a third gamma amplifying circuit generating third gamma reference voltages corresponding to an image of a third color. According to some embodiments, the first gamma amplifying circuit, the second gamma amplifying circuit and the third gamma amplifying circuit may have different bias currents.

According to some embodiments, the data driver and the gamma reference voltage generator may be formed as an integrated data driver.

According to some embodiments, in a method of driving a display panel according to the present disclosure, the method includes outputting a gate signal to a display panel, generating gamma reference voltages using a gamma amplifying circuit configured to generates a different bias code based on a gamma voltage range which is from a voltage level corresponding to a zero grayscale to a voltage level corresponding to a setting luminance and to receive a bias current based on the gamma bias code and outputting a data voltage to the display panel based on input image data and the gamma reference voltages.

According to some embodiments, based on the voltage level corresponding to the setting luminance of the gamma voltage range being higher than a voltage level of a reference luminance, a first bias current may be applied to the gamma amplifying circuit.

According to some embodiments, based on the voltage level corresponding to the setting luminance of the gamma voltage range being lower than the voltage level of the reference luminance, a second bias current lower than the first bias current may be applied to the gamma amplifying circuit.

According to some embodiments, based on the voltage level corresponding to the setting luminance of the gamma voltage range being a voltage level of a maximum luminance, a third bias current higher than the first bias current may be applied to the gamma amplifying circuit.

According to some embodiments, the bias current may be updated on frame by frame.

According to some embodiments, based on the gamma voltage range of a present frame being wider than the gamma voltage range of a previous frame, the bias current of the present frame may be higher than the bias current of the previous frame.

According to some embodiments, based on the gamma voltage range of a present frame being narrower than the gamma voltage range of a previous frame, the bias current of the present frame may be lower than the bias current of the previous frame.

In a display apparatus and a method of driving a display panel using the display apparatus, according to some embodiments, the bias current of the gamma amplifier may be changed according to the data of the image displayed on the display panel, so that a power consumption of the display apparatus may be relatively reduced without reducing a display quality of the display panel.

BRIEF DESCRIPTION OF THE DRAWINGS

The above and other features and characteristics of embodiments according to the present disclosure will become more apparent by describing in more detail aspects of some embodiments thereof with reference to the accompanying drawings, in which:

FIG. 4 is a table of a gamma bias code generated by a gamma bias setting circuit of FIG. 2 and FIG. 3;

FIG. 5 is a table of a gamma bias current code generated by a gamma bias controlling circuit of FIG. 2 and FIG. 3;

FIG. 6 is a table of a bias current generated by a bias current outputting circuit of FIG. 2 and FIG. 3;

DETAILED DESCRIPTION

Hereinafter, aspects of some embodiments of the present disclosure will be described in more detail with reference to the accompanying drawings.

Figure 1:
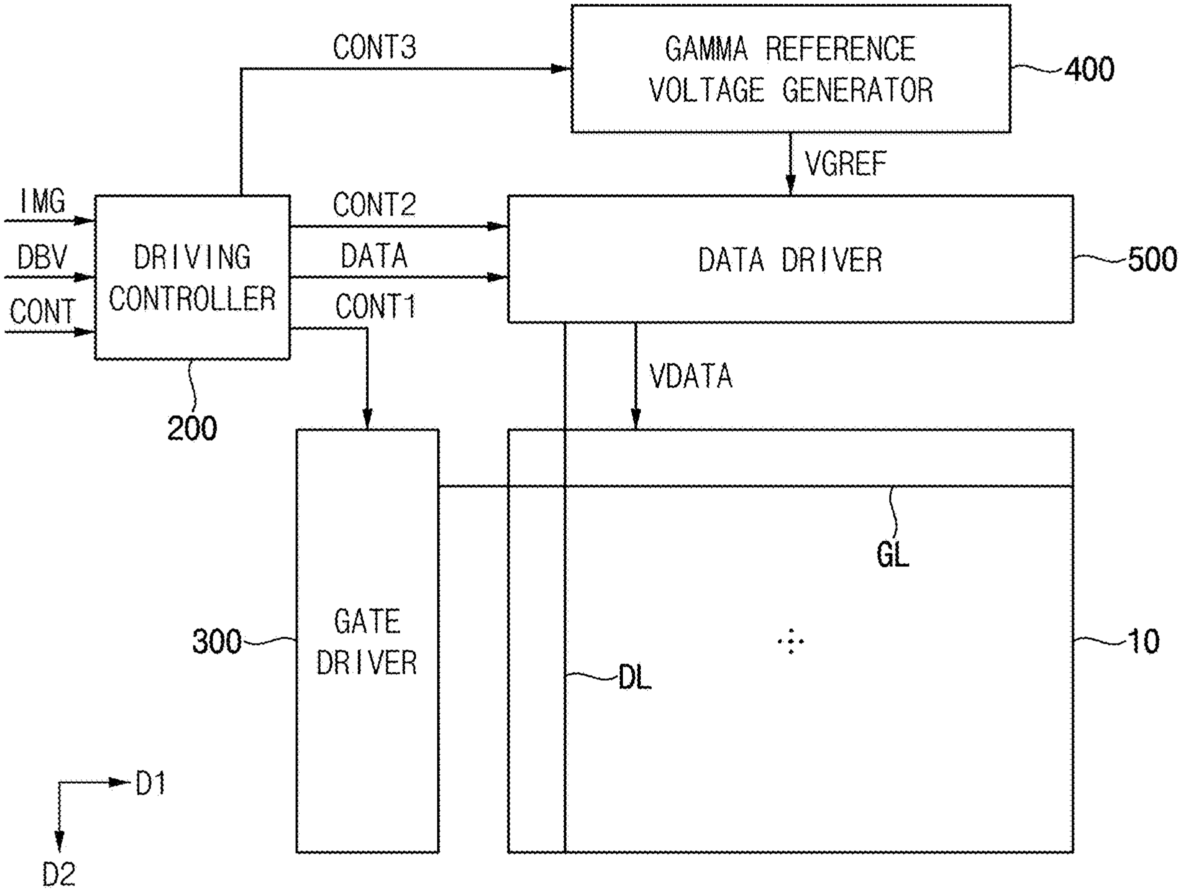
FIG. 1 is a block diagram illustrating a display apparatus according to some embodiments of the present disclosure.

FIG. 1 is a block diagram illustrating a display apparatus according to some embodiments of the present disclosure.

Referring to FIG. 1, the display apparatus includes a display panel 10 and a display panel driver. The display panel driver may include a driving controller 200, a gate driver 300, a gamma reference voltage generator 400 and a data driver 500.

For example, the driving controller 200 and the data driver 500 may be formed integrally with each other. For example, the driving controller 200, the gamma reference voltage generator 400, and the data driver 500 may be formed integrally with each other. For example, the driving controller 200, the gate driver 300, the gamma reference voltage generator 400, and the data driver 500 may be formed integrally with each other.

The display panel 10 includes a display region configured to display images and a peripheral region adjacent to (e.g., in a periphery or outside a footprint of) the display region.

For example, the display panel 10 may be an organic light emitting diode display panel including an organic light emitting diode. Alternatively, the display panel 10 may be a liquid crystal display panel including liquid crystal.

The display panel 10 includes a plurality of gate lines GL, a plurality of data lines DL and a plurality of pixels electrically connected to the gate lines GL and the data lines DL respectively. The gate lines GL extend in a first direction D1 and the data lines DL extend in a second direction D2 crossing the first direction D1.

The driving controller 200 receives input image data IMG, an input control signal CONT and a luminance region data DBV from an external device. For example, the input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronization signal and a horizontal synchronization signal. The luminance region data DBV may include a luminance of the input image data IMG and a setting luminance. For example, the setting luminance may be set directly by a user of display apparatus. Alternatively, the setting luminance may be set automatically by sensing a luminance around the display apparatus.

The driving controller 200 generates a first control signal CONT1, a second control signal CONT2, a third control signal CONT3 and a data signal DATA based on the input image data IMG, the input control signal CONT and the luminance region data DBV.

The driving controller 200 generates the first control signal CONT1 for controlling an operation of the gate driver 300 based on the input control signal CONT and outputs the generated first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT and outputs the generated second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT and outputs the generated third control signal CONT3 to the gamma reference voltage generator 400.

The gate driver 300 generates gate signals for driving the gate lines GL in response to the first control signal CONT1 received from the driving controller 200. The gate driver 300 may output the gate signal to the gate line GL. For example, the gate driver 300 may sequentially output the gate signals to the gate lines GL.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to each of the data signal DATA.

For example, the gamma reference voltage generator 400 may generate the gamma reference voltage VGREF corresponding to a zero grayscale to a 255 grayscale. However, embodiments according to the present disclosure are not limited to a grayscale range. For example, the gamma reference voltage generator 400 may generate the gamma reference voltage VGREF corresponding to a zero grayscale to a 2047 grayscale.

For example, the gamma reference voltage generator 400 may be located in the driving controller 200 or in the data driver 500.

The data driver 500 receives the second control signal CONT2 and the data signal DATA from the driving controller 200 and receives the gamma reference voltage VGREF from the gamma reference voltage generator 400. The data driver 500 converts the data signal DATA into a data voltage VDATA having an analog type by using the gamma reference voltage VGREF. The data driver 500 outputs the data voltage VDATA to the data line DL.

Figure 2:
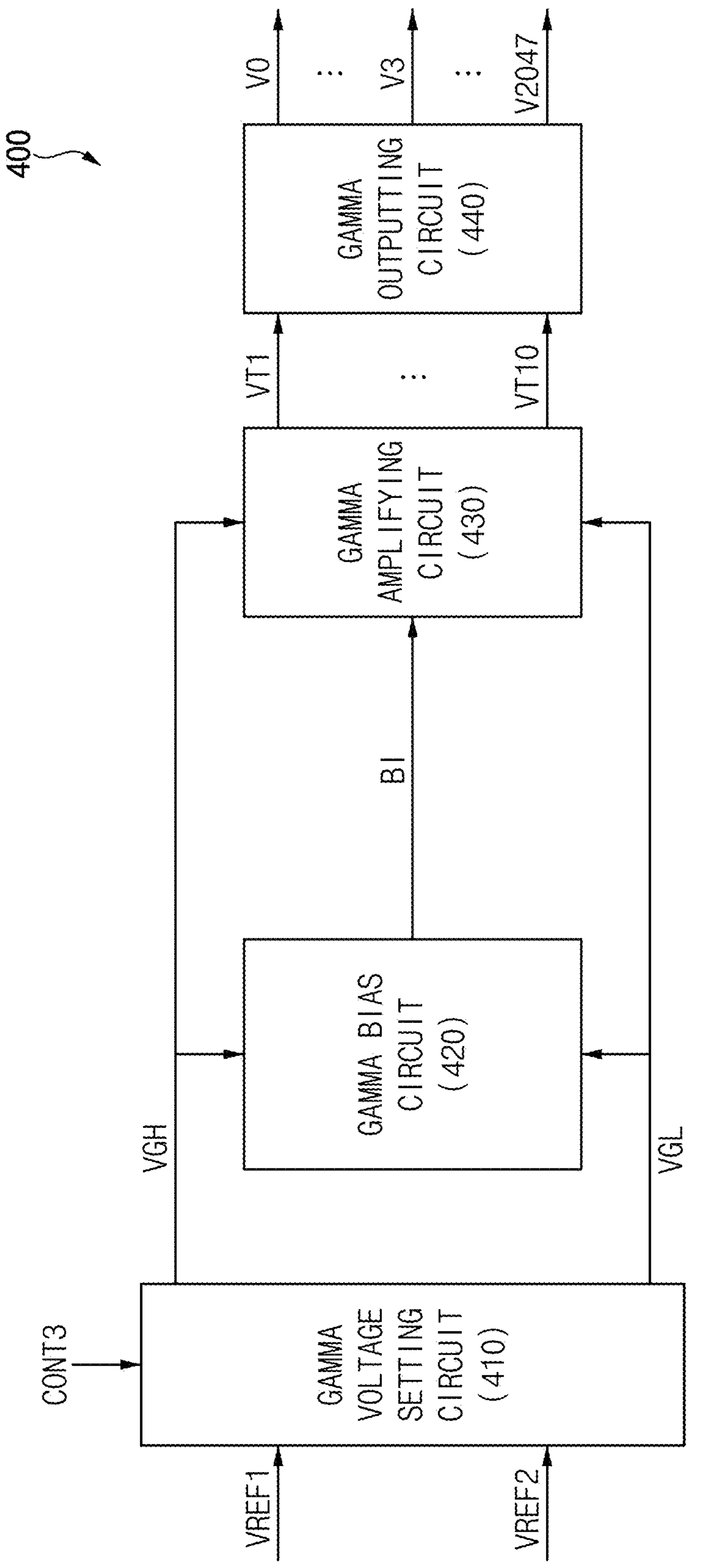
FIG. 2 is a block diagram illustrating an example of a gamma reference voltage generator included in the display apparatus of FIG. 1.
Figure 3:
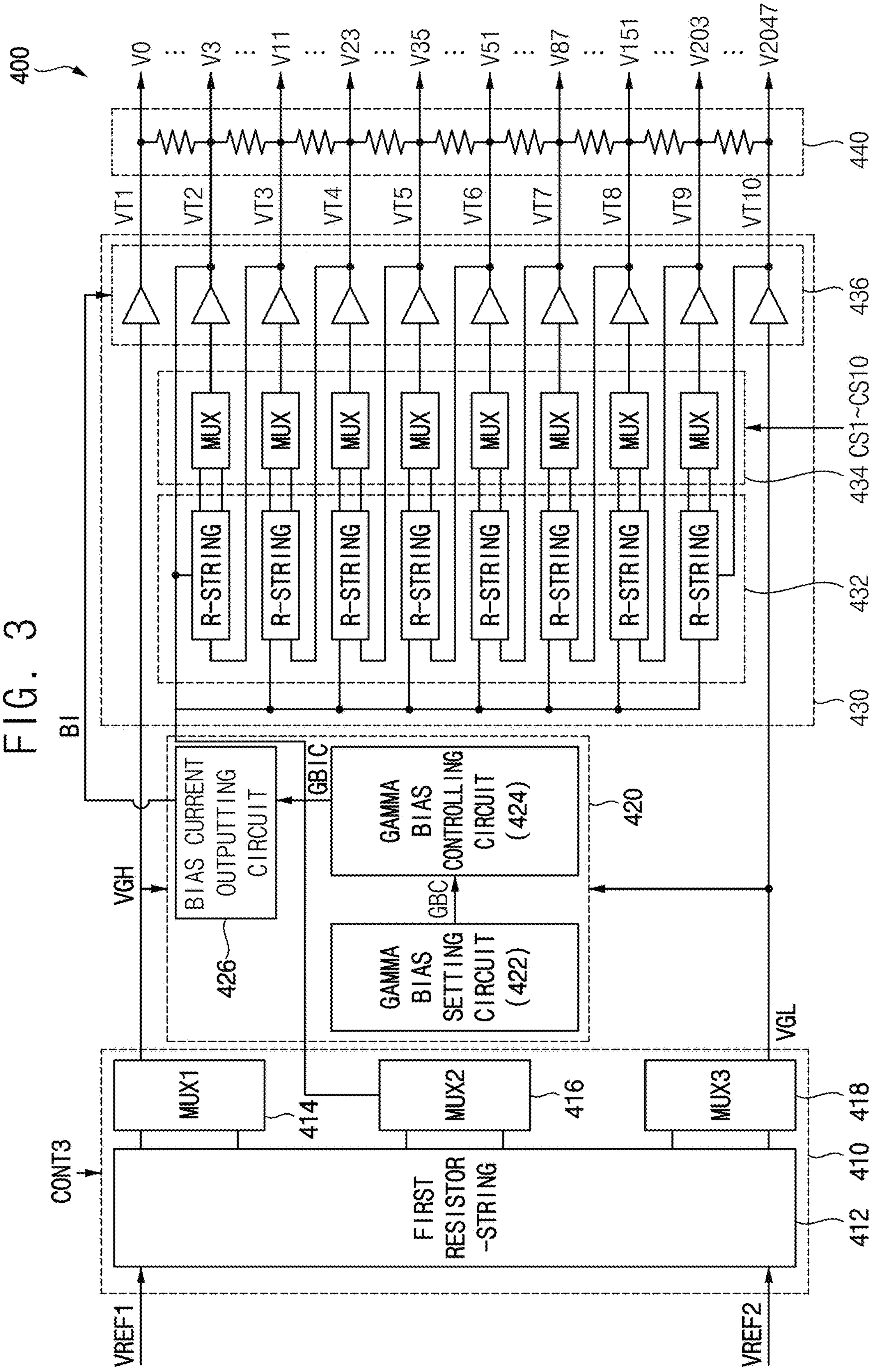
FIG. 3 is a block diagram illustrating an example of a gamma reference voltage generator included in the display apparatus of FIG. 1.

FIG. 2 is a block diagram illustrating an example of a gamma reference voltage generator 400 included in the display apparatus of FIG. 1. FIG. 3 is a block diagram illustrating an example of a gamma reference voltage generator 400 included in the display apparatus of FIG. 1. FIG. 4 is a table of a gamma bias code GBC generated by gamma bias setting circuit 422 of FIG. 2 and FIG. 3. FIG. 5 is a table of a gamma bias current code GBIC generated by a gamma bias controlling circuit 424 of FIG. 2 and FIG. 3. FIG. 6 is a table of a bias current BI generated by a bias current outputting circuit 426 of FIG. 2 and FIG. 3.

Referring to FIG. 2 to FIG. 6, the gamma reference voltage generator 400 may include a gamma voltage setting circuit 410, a gamma bias circuit 420, a gamma amplifying circuit 430 and a gamma outputting circuit 440. The gamma reference voltage generator 400 of FIG. 2 and FIG. 3 may correspond to the gamma reference voltage generator 400 of FIG. 1.

The gamma voltage setting circuit 410 receives a first reference voltage VREF1 and a second reference voltage VREF2 and may select a high gamma reference voltage VGH corresponding to a lowest grayscale gamma tap voltage between the first reference voltage VREF1 and the second reference voltage VREF2 and a low gamma reference voltage VGL corresponding to a highest grayscale gamma tap voltage between the first reference voltage VREF1 and the second reference voltage VREF2. The low gamma reference voltage VGL may be defined as a gamma voltage generated based on a maximum grayscale of the input image data IMG in one frame and the setting luminance.

According to some embodiments, the gamma voltage setting circuit 410 may include a first resistor-string 412, a first reference selecting circuit 414, a second reference selecting circuit 416 and a third reference selecting circuit 418. The first resistor-string 412 may distribute the first reference voltage VREF1 and the second reference voltage VREF2. The first resistor-string 412 may include a plurality of resistors connected in series. The first reference voltage VREF1 and the second reference voltage VREF2 may be applied to both ends of the first resistor-string 412. A plurality of voltages may be distributed and may be outputted at contact points between the resistors included in the first resistor-string 412.

The first reference selecting circuit 414 may select one of the voltages distributed by the first resistor-string 412 as the high gamma reference voltage VGH based on the third control signal CONT3. According to some embodiments, the first reference selecting circuit 414 may select a gamma reference voltage corresponding to a zero grayscale of the input image data IMG as the high gamma reference voltage VGH. The gamma reference voltage corresponding to the zero grayscale may be called as a voltage level corresponding to the zero grayscale.

The second reference selecting circuit 416 receives a plurality of voltages that are relatively close to the first reference voltage VREF1 from the first resistor-string 412 and may select one of the voltages distributed by the first resistor-string 412 as a low grayscale gamma reference voltage based on the third control signal CONT3. According to some embodiments, the second reference selecting circuit 416 may select a gamma reference voltage corresponding to a low grayscale of the input image data IMG as the low grayscale gamma reference voltage for each frame.

The third reference selecting circuit 418 receives a plurality of voltages that are relatively close to the second reference voltage VREF2 from the first resistor-string 412, may select a low gamma reference voltage VGL based on the setting luminance and may output the low gamma reference voltage VGL. For example, the low gamma reference voltage VGL may correspond to a voltage level of the setting luminance. For example, the first to the third reference selecting circuit 414, 416 and 418 may be multiplexers selecting and outputting one of a plurality of input voltages.

For example, a grayscale of the input image data IMG may have a zero grayscale to a 2047 grayscale. However, embodiments according to the present disclosure are not limited to a grayscale range of the input image data IMG. For example, a grayscale of the input image data IMG may have a zero grayscale to a 255 grayscale.

The gamma bias circuit 420 may include a gamma bias setting circuit 422, a gamma bias controlling circuit 424 and a bias current outputting circuit 426.

The gamma bias setting circuit 422 may generate a gamma bias code GBC based on a gamma voltage range VGRG which is from a voltage level corresponding to a zero grayscale to a voltage level corresponding to the setting luminance.

Unlike a conventional display apparatus, the gamma voltage range VGRG of the display apparatus according to the present disclosure may determine a range up from the voltage level corresponding to the zero grayscale to the low gamma reference voltage VGL while the voltage level corresponding to the zero grayscale is fixed. For example, the voltage level corresponding to the zero grayscale may be 7 volts (V) (or about 7V). For example, the low gamma reference voltage VGL may be changed to 1V (or about 1V) in a high luminance region while the voltage level corresponding to the zero grayscale is fixed. In this case, the gamma voltage range VGRG in the high luminance region may be 6V (or about 6V). For example, the low gamma reference voltage VGL may be changed to 5V (or about 5V) in a low luminance region (that is, a luminance region lower than the high luminance region) while the voltage level corresponding to the zero grayscale is fixed. In this case, the gamma voltage range VGRG in the low luminance region may be 2V (or about 2V). However, embodiments according to the present disclosure are not limited to the above voltage levels.

In the gamma voltage range VGRG of the display apparatus according to the present disclosure, the low gamma reference voltage VGL may be changed while the voltage level corresponding to the zero grayscale is fixed. Accordingly, the gamma voltage range VGRG may be determined by the changed low gamma reference voltage (e.g. a setting luminance voltage level). Additionally, the gamma bias circuit 420 may easily control a bias current BI applied to the gamma amplifying circuit 430 in the high luminance region and the low luminance region.

According to some embodiments, a maximum reference range RG1 may be determined as a range from the voltage level corresponding to the zero grayscale to a voltage level corresponding to a maximum luminance. A reference range may be determined as a range from the voltage level corresponding to the zero grayscale to a voltage level corresponding to a reference luminance.

For example, a range from the voltage level corresponding to the zero grayscale to a voltage level corresponding to a first reference luminance may be called as a first reference range RG2. For example, a range from the voltage level corresponding to the zero grayscale to a voltage level corresponding to a second reference luminance may be called as a second reference range RG3. For example, a range from the voltage level corresponding to the zero grayscale to a voltage level corresponding to a third reference luminance may be called as a third reference range RG4. For example, a range from the voltage level corresponding to the zero grayscale to a voltage level corresponding to a fourth reference luminance may be called as a fourth reference range RG5. For example, a range from the voltage level corresponding to the zero grayscale to a voltage level corresponding to a fifth reference luminance may be called as a fifth reference range RG6. For example, a range from the voltage level corresponding to the zero grayscale to a voltage level corresponding to a sixth reference luminance may be called as a sixth reference range RG7. For example, a range from the voltage level corresponding to the zero grayscale to a voltage level corresponding to a seventh reference luminance may be called as a seventh reference range RG8.

According to some embodiments, when the gamma voltage range VGRG is the maximum reference range RG1 which is from the voltage level corresponding to the zero grayscale to the voltage level corresponding to a maximum luminance, the first gamma bias code GBC1 may be generated. When the gamma voltage range VGRG is wider than the first reference range RG2 and narrower than the maximum reference range RG1, the second gamma bias code GBC2 may be generated. When the gamma voltage range VGRG is wider than the second reference range RG3, which is narrower than the first reference range RG2, and narrower than the first reference range RG2, the third gamma bias code GBC3 may be generated. When the gamma voltage range VGRG is wider than the third reference range RG4, which is narrower than the second reference range RG3, and narrower than the second reference range RG3, the fourth gamma bias code GBC4 may be generated. When the gamma voltage range VGRG is wider than the fourth reference range RG5, which is narrower than the third reference range RG4, and narrower than the third reference range RG4, the fifth gamma bias code GBC5 may be generated. When the gamma voltage range VGRG is wider than the fifth reference range RG6, which is narrower than the fourth reference range RG5, and narrower than the fourth reference range RG5, the sixth gamma bias code GBC6 may be generated. When the gamma voltage range VGRG is wider than the sixth reference range RG7, which is narrower than the fifth reference range RG6, and narrower than the fifth reference range RG6, the seventh gamma bias code GBC7 may be generated. When the gamma voltage range VGRG is wider than the seventh reference range RG8, which is narrower than the sixth reference range RG7, and narrower than the sixth reference range RG7, the eighth gamma bias code GBC8 may be generated.

The first to seventh reference luminance may be set in a manufacturing process of the display apparatus. For example, when the maximum luminance is 100%, the first reference luminance may be 93.75% (or about 93.75%). However, embodiments according to the present disclosure are not limited to a value of the reference luminance. For example, the setting luminance voltage level may be expressed as a 3-bit hexadecimal value. For example, when the setting luminance voltage level has the voltage level corresponding to the maximum luminance, the setting luminance voltage level may be expressed as FFF code and when the setting luminance voltage level has the voltage level corresponding to the first reference luminance (e.g., 93.75% or about 93.75%), the setting luminance voltage level may be expressed as F00 code. Additionally, embodiments according to the present disclosure are not limited to the number of the reference luminance. For example, the number of the reference luminance may be set by the user.

The gamma bias controlling circuit 424 may receive the gamma bias code GBC from the gamma bias setting circuit 422. The gamma bias controlling circuit 424 may generate a gamma bias current code GBIC based on the gamma bias code GBC.

For example, the gamma bias controlling circuit 424 may generate a first gamma bias current code 111 based on the first gamma bias code GB1, may generate a second gamma bias current code 110 based on the second gamma bias code GB2, may generate a third gamma bias current code 101 based on the third gamma bias code GB3, may generate a fourth gamma bias current code 100 based on the fourth gamma bias code GB4, may generate a fifth gamma bias current code 011 based on the fifth gamma bias code GB5, may generate a sixth gamma bias current code 010 based on the sixth gamma bias code GB6, may generate a seventh gamma bias current code 001 based on the seventh gamma bias code GB7 and may generate an eighth gamma bias current code 000 based on the eighth gamma bias code GB8.

For example, the gamma bias current code GBIC may be a code of binary number. The gamma bias current code GBIC may have the number corresponding the gamma bias code GBC. However, the present disclosure is not limited to the number of the gamma bias current code GBIC. For example, the number of the gamma bias current code GBIC may be fewer than the number of the gamma bias code GBC. Additionally, although the gamma bias current code GBIC is described as a 3-bit value, the gamma bias current code GBIC of the present disclosure is not limited to a bit value. For example, the gamma bias current code GBIC may have a 4-bit value.

The bias current outputting circuit 426 may receive the gamma bias current code GBIC from the gamma bias circuit 420. The bias current outputting circuit 426 may output a bias current BI based on the gamma bias current code GBIC.

For example, when the bias current outputting circuit 426 receives the fourth gamma bias code 100, the bias current outputting circuit 426 may output a reference bias current as the bias current BI. For example, the reference bias current may be 0.3 mA (or about 0.03 mA). However, embodiments according to the present disclosure are not limited to a value of the reference bias current.

When the bias current outputting circuit 426 receives the first gamma bias current code 111, the bias current outputting circuit 426 may output a current corresponding to 137.5% (or about 137.5%) of the reference bias current as the bias current BI. When the bias current outputting circuit 426 receives the second gamma bias current code 110, the bias current outputting circuit 426 may output a current corresponding to 125% (or about 125%) of the reference bias current as the bias current BI. When the bias current outputting circuit 426 receives the third gamma bias current code 101, the bias current outputting circuit 426 may output a current corresponding to 112.5% (or about 112.5%) of the reference bias current as the bias current BI. When the bias current outputting circuit 426 receives the fifth gamma bias current code 011, the bias current outputting circuit 426 may output a current corresponding to 87.5% (or about 87.5%) of the reference bias current as the bias current BI. When the bias current outputting circuit 426 receives the sixth gamma bias current code 010, the bias current outputting circuit 426 may output a current corresponding to 75% (or about 75%) of the reference bias current as the bias current BI. When the bias current outputting circuit 426 receives the seventh gamma bias current code 001, the bias current outputting circuit 426 may output a current corresponding to 62.5% (or about 62.5%) of the reference bias current as the bias current BI. When the bias current outputting circuit 426 receives the eighth gamma bias current code 000, the bias current outputting circuit 426 may output a current corresponding to about 50% of the reference bias current as the bias current BI. However, a value of each of the bias currents BI corresponding to the gamma bias current code GBIC according to embodiments of the present disclosure may be determined by the user, so that embodiments according to the present disclosure are not limited to a ratio value of the reference bias current.

According to some embodiments, the bias current outputting circuit 426 of the display apparatus including the gamma reference voltage generator 400 generates and outputs different bias currents BI based on the gamma voltage range VGRG.

The gamma amplifying circuit 430 may generate and may output a plurality of gamma tap voltages (that is, a second gamma tap voltage VT2 to a ninth gamma tap voltage VT9) which are between a lowest grayscale gamma tap voltage (that is, a first gamma tap voltage VT1) and a highest grayscale gamma tap voltage (that is, a tenth gamma tap voltage VT10) based on the high gamma reference voltage VGH and the low gamma reference voltage VGL. The gamma amplifying circuit 430 may receive the high gamma reference voltage VGH outputted from the first reference selecting circuit 414 and the low gamma reference voltage VGL outputted from the third reference selecting circuit 418. The gamma amplifying circuit 430 distributes the high gamma reference voltage VGH and the low gamma reference voltage VGL, selects middle gamma voltages among the distributed voltages, generates the gamma tap voltages VT1 to VT10 and output the gamma tap voltages VT1 to VT10.

According to some embodiments, the gamma amplifying circuit 430 may include a second resistor-string 432, a plurality of gamma tap selecting circuits 434 and gamma amplifiers 436. The second resistor-string 432 may be connected in a cascade form to distribute the high reference gamma voltage VGH and the low reference gamma voltage VGL. The gamma tap selecting circuits 434 may select a portion of distributed voltages that are generated by the second resistor-string 432 based on a plurality of gamma tap selection signals CS1 to CS10. For example, each of the gamma tap selecting circuits 434 may be a multiplexer that selects one of a plurality of input voltages. In this case, the gamma tap selection signals CS1 to CS10 may be selected by an input of the user or by an external input or may be stored during a manufacturing process. The gamma amplifiers 436 may output voltages selected by the gamma tap selecting circuits 434 as the gamma tab voltages VT1 to VT10 based on the gamma bias current code GBIC. The gamma amplifiers 436 may have the bias current BI based on the gamma bias current code GBIC.

Generally, a long charge time is required for generating the gamma reference voltage VGREF corresponding to a high luminance region from the gamma reference voltage generator 400. Additionally, a value of the gamma tap voltages VT1 to VT10 may be changed by outputting the gamma reference voltage VGREF in the high luminance region. A long recovery time is required to restore a value of the changed gamma tap voltages VT1 to VT10. A current higher than the reference bias current may apply to the gamma amplifiers 436 of the present disclosure in the high luminance region for relatively reducing the long charge time and the recovery time.

Additionally, a long charge time is not required for generating the gamma reference voltage VGREF corresponding to a low luminance region from the gamma reference voltage generator 400. Accordingly, a current lower than the reference bias current may apply to the gamma amplifiers 436 of the present disclosure in the low luminance region for relatively reducing a power consumption.

Additionally, the gamma bias circuit 420 may output different bias currents BI for each gamma voltage range VGRG to the gamma amplifying circuit 430 through the reference ranges RG1 to RG8 set by the user. Accordingly, the charge time and the recovery time may be improved and a display quality of the display panel 10 may be improved by relatively reducing a power consumption.

The gamma amplifying circuit 430 may have a cascade structure. The gamma amplifying circuit 430 may include a plurality of stages. For example, The gamma amplifying circuit 430 may include first to tenth stages that output the first to tenth gamma tab voltages VT1 to VT10. The first stage may output the high reference gamma voltage VGH as the first gamma tab voltage VT1. The first gamma tab voltage VT1 may correspond to the gamma voltage VO of the zero grayscale. The Kth stage that outputs the Kth gamma tab voltage (where K is an integer between 2 and 9) may include a resistor-string, a gamma tap selecting circuit and the gamma amplifier. The Kth stage may distribute the first gamma tab voltage VT1 and the (K+1)th gamma tab voltage using the resistor-string, may select one of distributed voltages that are generated by the gamma tap selecting circuit and may output the selected voltage as the Kth gamma tab voltage using the gamma amplifier. For example, the second stage may distribute the first gamma tab voltage VT1 and the third gamma tab voltage VT3 using the resistor-string, may select one of distributed voltages that are generated by the gamma tap selecting circuit and may output the selected voltage as the second gamma tab voltage VT2 using the gamma amplifier. The second gamma tab voltage VT2 may correspond to the gamma voltage V3 of the three grayscale. The tenth stage may output the low reference gamma voltage VGL as the tenth gamma tab voltage VT10. The tenth gamma tab voltage VT10 may correspond to the gamma voltage V255 of the 2047 grayscale. The bias current BI of the gamma amplifier of the first stage to the tenth stage may be controlled based the gamma bias current code GBIC.

The gamma outputting circuit 440 may distribute the gamma tab voltages VT1 to VT10 to output the gamma voltages VO to V2047. According to some embodiments, the gamma outputting circuit 440 may generate the gamma voltages VO to V2047 by distributing the gamma tab voltages VT1 to VT10 using a third resistor-string. However, the present disclosure is not limited to the number of the gamma voltages which the gamma outputting circuit 440 may generate.

According to some embodiments, the bias current BI of the gamma amplifying circuit may be updated on frame by frame. For example, when the gamma voltage range VGRG of a present frame is wider than the gamma voltage range VGRG of a previous frame, the bias current BI of the present frame may be higher than the bias current BI of the previous frame. When the gamma voltage range VGRG of a present frame is narrower than the gamma voltage range VGRG of a previous frame, the bias current BI of the present frame may be lower than the bias current BI of the previous frame. The bias current BI is updated on frame by frame of the display apparatus, so that a power consumption of the display apparatus may be controlled more easily.

Figure 7:
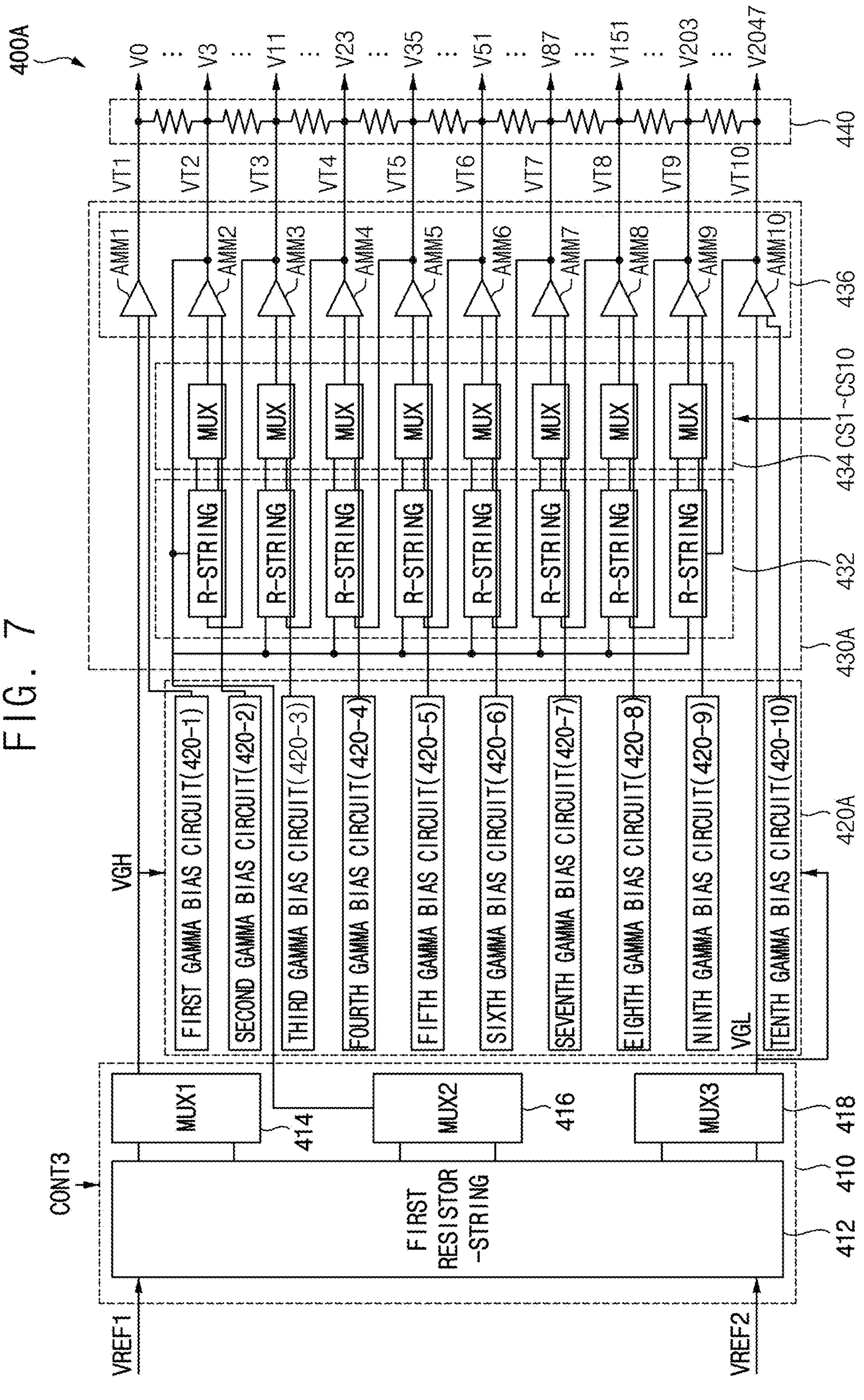
FIG. 7 is a diagram illustrating a gamma reference voltage generator of FIG. 1 according to some embodiments.

FIG. 7 is a diagram illustrating a gamma reference voltage generator 400A of FIG. 1 according to some embodiments.

A display apparatus and a method of driving a display panel using the display apparatus according to the present embodiments is substantially same as the display apparatus and the method of driving the display panel using the display apparatus described with reference to FIG. 1 to FIG. 6 except for a structure of a gamma reference voltage generator 400A, so that the same reference numerals will be used to refer to the same and some repetitive explanation concerning the above elements may be omitted.

Referring to FIG. 1, FIG. 2 and FIG. 4 to FIG. 7, a gamma bias circuit 420A of a gamma reference voltage generator 400A according to the present embodiments may include first to tenth gamma bias circuits 420-1 to 420-10. A gamma amplifying circuit 430A may include first to tenth gamma amplifiers AMM1 to AMM10 corresponding to the first to tenth gamma bias circuit 420-1 to 420-10, respectively.

For example, the first gamma bias circuit 420-1 may generate a first amp gamma bias code based on the gamma voltage range VGRG which is from a voltage level corresponding to a zero grayscale to a voltage level corresponding to the setting luminance. The first gamma amplifier AMM1 may receive a first amp bias current based on the first amp gamma bias code.

For example, the second gamma bias circuit 420-2 may generate a second amp gamma bias code different from the first amp gamma bias code based on the gamma voltage range VGRG which is from a voltage level corresponding to a zero grayscale to a voltage level corresponding to the setting luminance. The second gamma amplifier AMM2 may receive a second amp bias current different from the first amp bias current based on the second amp gamma bias code.

For example, the third to tenth gamma bias circuits 420-3 to 420-10 may generate third to tenth amp gamma bias codes different from the first amp gamma bias code and the second amp gamma bias code based on the gamma voltage range VGRG which is from a voltage level corresponding to a zero grayscale to a voltage level corresponding to the setting luminance. The third to the tenth gamma amplifiers AMM3 to AMM10 may receive third to tenth amp bias currents different from the first amp bias current and the second amp bias current based on the third to tenth amp gamma bias codes.

The bias currents BI applied to the first gamma amplifier AMM1 to the tenth gamma amplifier AMM10 are different, so that a power consumption of the display apparatus of the present disclosure may be controlled more easily.

Figure 8:
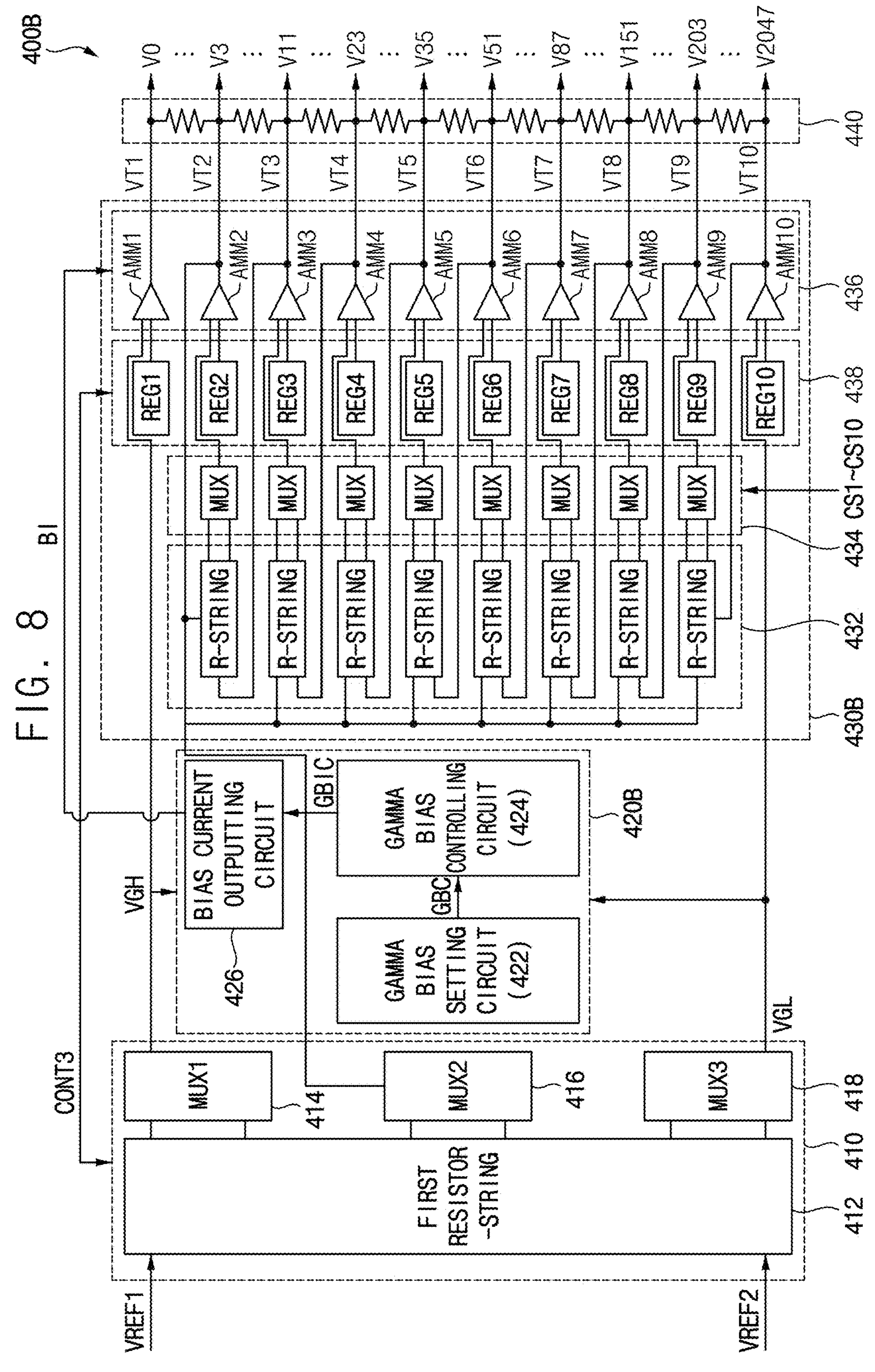
FIG. 8 is a diagram illustrating a gamma reference voltage generator of FIG. 1 according to some embodiments.

FIG. 8 is a diagram illustrating a gamma reference voltage generator 400B of FIG. 1 according to some embodiments.

A display apparatus and a method of driving a display panel using the display apparatus according to the present embodiments is substantially same as the display apparatus and the method of driving the display panel using the display apparatus described with reference to FIG. 1 to FIG. 6 except for a structure of a gamma reference voltage generator 400A, so that the same reference numerals will be used to refer to the same and some repetitive explanation concerning the above elements may be omitted.

Referring to FIG. 1, FIG. 2, FIG. 4 to FIG. 6 and FIG. 8, a gamma amplifying circuit 430B of a gamma reference voltage generator 400B according to some embodiments may further include a luminance setting circuit 438. The luminance setting circuit 438 may include luminance setting register REG1 to REG10. The luminance setting register REG1 to REG10 may apply a current signal to the gamma amplifiers AMM1 to AMM10 based on the setting luminance. The gamma amplifiers AMM1 to AMM10 may receive the current signal, respectively. Additionally, the bias current BI of the gamma amplifiers AMM1 to AMM10 may be controlled entirely based on the gamma voltage range VGRG.

That is, the gamma amplifiers AMM1 to AMM10 according to the present disclosure may have different bias currents BI and additionally, the bias currents BI of the gamma amplifiers AMM1 to AMM10 may be controlled entirely. Accordingly, a power consumption of the display apparatus according to the present disclosure may be controlled more efficiently.

Figure 9:
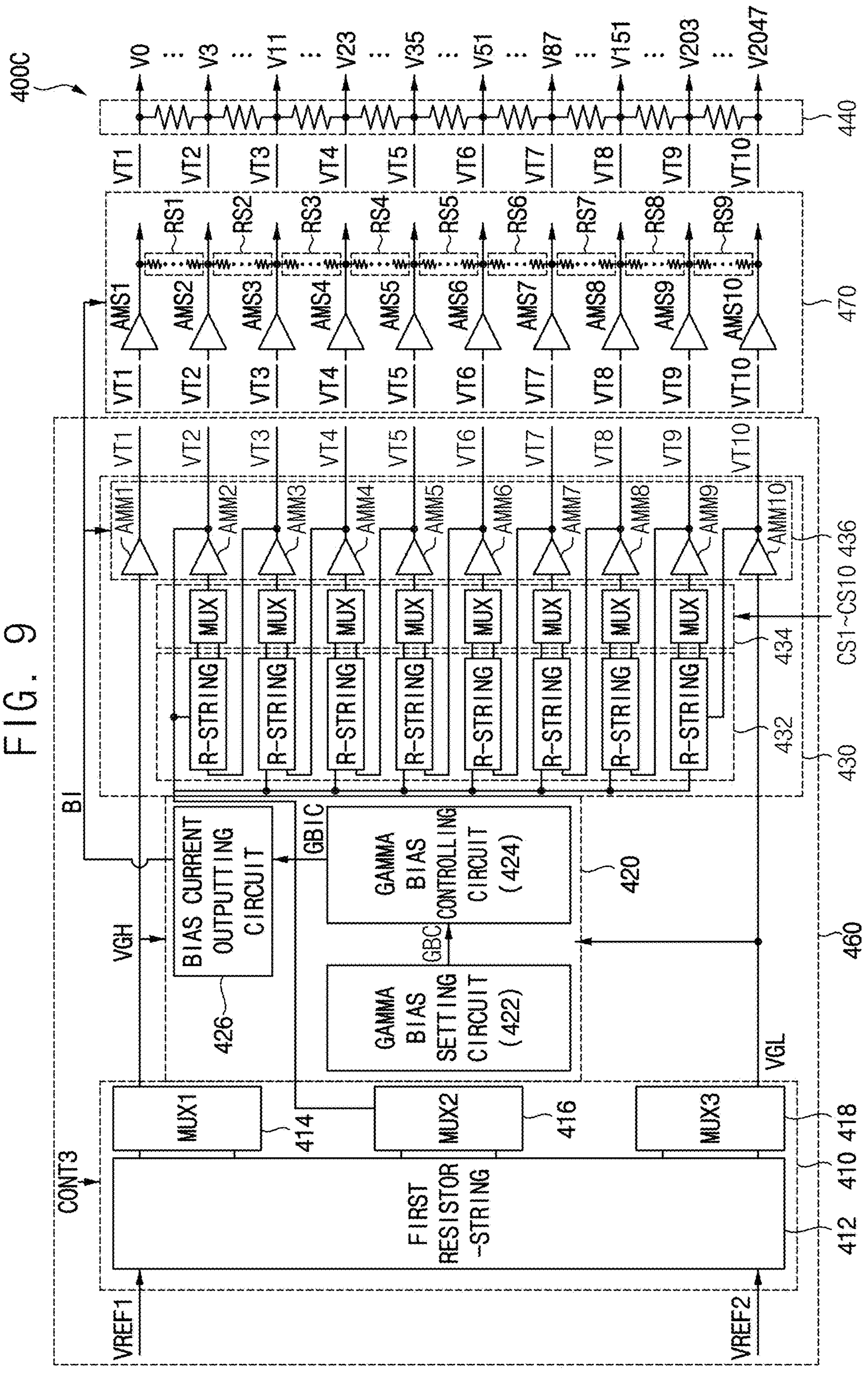
FIG. 9 is a diagram illustrating a gamma reference voltage generator of FIG. 1 according to some embodiments.

FIG. 9 is a diagram illustrating a gamma reference voltage generator 4000 of FIG. 1 according to some embodiments.

A display apparatus and a method of driving a display panel using the display apparatus according to the present embodiments is substantially same as the display apparatus and the method of driving the display panel using the display apparatus described with reference to FIG. 1 to FIG. 6 except for a structure of a gamma reference voltage generator 400A, so that the same reference numerals will be used to refer to the same and some repetitive explanation concerning the above elements may be omitted.

Referring to FIG. 1, FIG. 2, FIG. 4 to FIG. 6 and FIG. 9, the display apparatus includes a display panel 100 and a display panel driver. The display panel driver includes the driving controller 200, the gate driver 300, the gamma reference voltage generator 4000 and the data driver 500.

According to some embodiments, the gamma reference voltage generator 4000 may include the gamma outputting circuit 440, a master gamma reference voltage generator 460 including master gamma amplifiers AMM1 to AMM10 outputting master gamma reference voltages VT1 to VT10 and a slave gamma reference voltage generator 470 including slave gamma amplifiers AMS1 to AMS10 receiving the master gamma reference voltages VG1 to VG10 and outputting the master gamma reference voltages VT1 to VT10 to the data driver 500 and slave resistor-strings RS1 to RS10 located between the slave gamma amplifiers AMS1 to AMS10. The slave resistor-strings RS1 to RS10 of the slave gamma reference voltage generator 470 may output slave gamma reference voltages having levels between the master gamma reference voltages VT1 to VT10.

For example, the master gamma amplifiers AMM1 to AMM10 may correspond to the slave gamma amplifiers AMS1 to AMS10 one to one.

The master gamma amplifier and the slave gamma amplifier which correspond to each other may have the same bias current BI. For example, the bias current BI of FIG. 6 may be applied to both the master gamma amplifier and the slave gamma amplifier.

According to some embodiments, the slave gamma reference voltage generator 470 may include first gamma amplifiers generating a first gamma reference voltage corresponding to an image of a first color, second gamma amplifiers generating a second gamma reference voltage corresponding to an image of a second color and third gamma amplifiers generating a third gamma reference voltage corresponding to an image of a third color. A first color bias current of the first gamma amplifiers may be generated based on the setting luminance, a second color bias current of the second gamma amplifiers may be generated based on the setting luminance and a third color bias current of the third gamma amplifiers may be generated based on the setting luminance. The first color bias current, the second color bias current and the third color bias current may be same or different.

According to some embodiments, the master gamma amplifiers AMM1 to AMM10 and the slave gamma amplifiers AMS1 to AMS10 of the display apparatus including the gamma reference voltage generator 4000 may receive different bias currents BI based on the setting luminance.

Generally, along charge time is required for generating the gamma reference voltage VGREF corresponding to the high luminance region from the gamma reference voltage generator 400. Additionally, a value of the gamma tap voltages VT1 to VT10 may be changed by outputting the gamma reference voltage VGREF in the high luminance region. A long recovery time is required to restore a value of the changed gamma tap voltages VT1 to VT10. Accordingly, the master gamma amplifiers AMM1 to AMM10 and the slave gamma amplifiers AMS1 to AMS10 of the present disclosure may receive a current higher than the reference bias current in the high luminance region for relatively reducing the long charge time and the recovery time.

Additionally, along charge time is not required for generating the gamma reference voltage VGREF corresponding to a low luminance region from the gamma reference voltage generator 400. Accordingly, the master gamma amplifiers AMM1 to AMM10 and the slave gamma amplifiers AMS1 to AMS10 of the present disclosure may receive a current lower than the reference bias current in the low luminance region for relatively reducing a power consumption.

Additionally, the master gamma reference voltage generator 460 and the slave gamma reference voltage generator 470 may generate the first color bias current, the second color bias current and the third color bias current which have different value through the reference ranges RG1 to RG8 set by the user. Accordingly, the charge time and the recovery time may be improved and the display quality of the display panel 10 may be improved by relatively reducing a power consumption.

Figure 10:
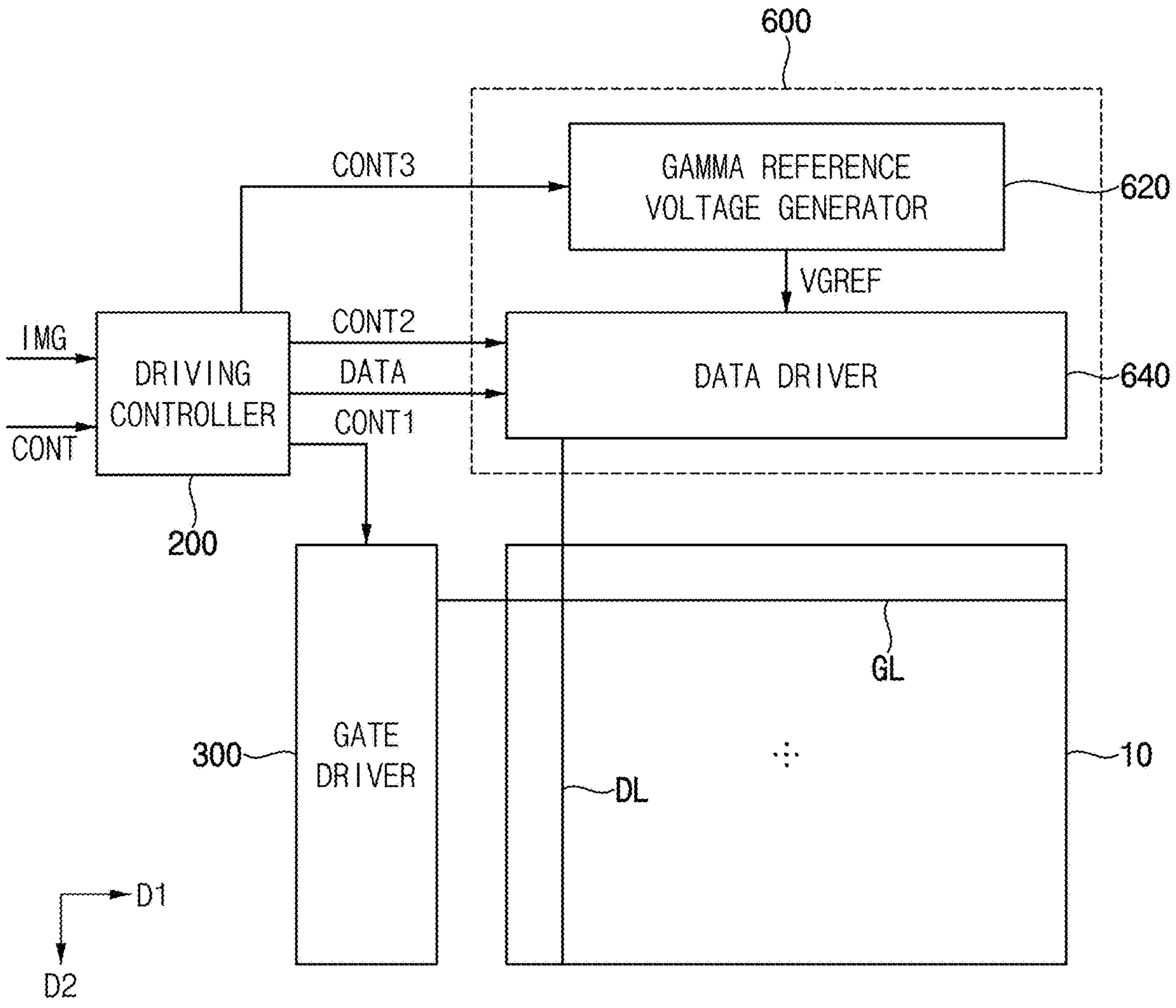
FIG. 10 is a block diagram illustrating a display apparatus according to some embodiments of the present disclosure.

FIG. 10 is a block diagram illustrating a display apparatus according to some embodiments of the present disclosure.

A display apparatus and a method of driving a display panel using the display apparatus according to the present embodiments is substantially same as the display apparatus and the method of driving the display panel using the display apparatus described with reference to FIG. 1 to FIG. 6 except for a structure of a data driver and a gamma reference voltage generator, so that the same reference numerals will be used to refer to the same and some repetitive explanation concerning the above elements may be omitted.

Referring to FIG. 2 to FIG. 6 and FIG. 10, the display apparatus includes a display panel 100 and a display panel driver. The display panel driver includes a driving controller 200, a gate driver 300, a gamma reference voltage generator 620 and a data driver 640.

According to some embodiments, the gamma reference voltage generator 620 and the data driver 640 may form a single integrated data driver 600.

According to some embodiments, the gamma amplifiers 436 of the gamma reference voltage generator 620 may receive the bias current BI based on the setting luminance.

According to some embodiments, the bias current BI of the gamma amplifiers is controlled according to the luminance region data DBV displayed on the display panel 10, so that a power consumption of a display apparatus may be relatively reduced without reducing a display quality of the display panel 10.

Figure 11:
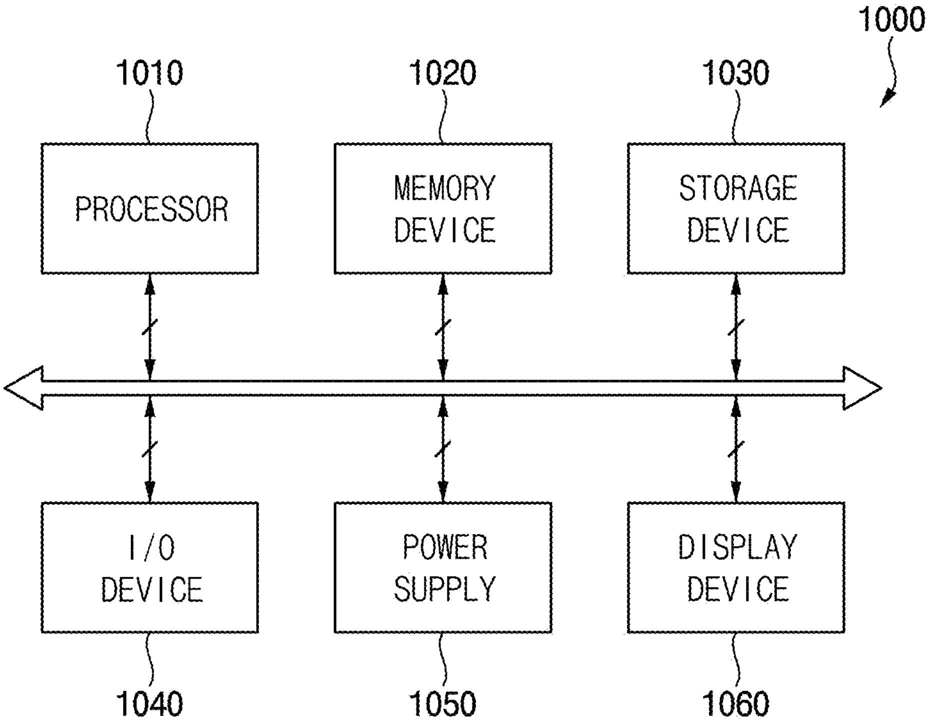
FIG. 11 is a block diagram illustrating an electronic apparatus according to some embodiments of the present disclosure.
Figure 12:
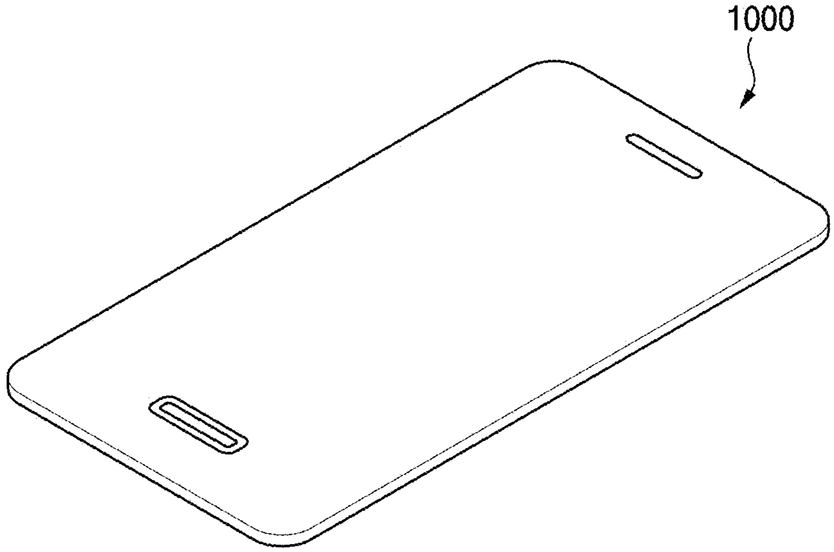
FIG. 12 is a diagram illustrating an example in which the electronic apparatus of FIG. 11 is implemented as a smart phone.

FIG. 11 is a block diagram illustrating an electronic apparatus according to some embodiments of the present disclosure. FIG. 12 is a view illustrating an example in which the electronic apparatus of FIG. 11 is implemented as a smart phone.

Referring to FIG. 11 and FIG. 12, the electronic apparatus 1000 may include a processor 1010, a memory device 1020, a storage device 1030, an input/output (I/O) device 1040, a power supply 1050 and a display device 1060. Here, the display device 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

According to some embodiments, as shown in FIG. 12, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device and the like.

The processor 1010 may perform various computing functions or various tasks. The processor 1010 may be a micro-processor, a central processing unit (CPU), an application processor (AP) and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device and the like and/or at least one volatile memory device such as a dynamic random access memory (DRAM) device, a static random access memory (SRAM) device, a mobile DRAM device and the like.

The storage device 1030 may include a solid state drive (SSD) device, a hard disk drive (HDD) device, a CD-ROM device and the like. The I/O device 1040 may include an input device such as a keyboard, a keypad, a mouse device, a touch-pad, a touch-screen and the like and an output device such as a printer, a speaker and the like. In some embodiments, the display device 1060 may be included in the 1/O device 1040. The power supply 1050 may provide power for operations of the electronic apparatus 1000. The display device 1060 may be coupled to other components via the buses or other communication links.

In a display apparatus and a method of driving a display panel using the display apparatus, according to some embodiments, the bias current of the gamma amplifier is changed according to the data of the image displayed on the display panel, so that a power consumption of the display apparatus may be relatively reduced.

The foregoing is illustrative of the present disclosure and is not to be construed as limiting thereof. Although aspects of some embodiments of the present disclosure have been described, those skilled in the art will readily appreciate that many modifications are possible in the embodiments without materially departing from the novel teachings and characteristics of embodiments according to the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific embodiments disclosed and that modifications to the disclosed embodiments, as well as other embodiments, are intended to be included within the scope of the appended claims. Embodiments according to the present disclosure are defined by the following claims, with equivalents of the claims to be included therein.

What is claimed is:

1. A display apparatus comprising:

a display panel including a pixel and configured to display an image based on input image data;

a gate driver configured to output a gate signal to the pixel;

a data driver configured to output a data voltage to the pixel; and a gamma reference voltage generator including a gamma bias circuit configured to generate a bias current based on a gamma voltage range which is from a voltage level corresponding to a zero grayscale to a voltage level corresponding to a setting luminance and a gamma amplifying circuit configured to receive the bias current, the gamma reference voltage generator being configured to generate gamma reference voltages and to output the gamma reference voltages to the data driver;

wherein the gamma reference voltage generator further comprises a gamma voltage setting circuit configured to output a high gamma reference voltage and a low gamma reference voltage based on the input image data, and wherein the gamma bias circuit comprises:

a gamma bias setting circuit configured to output a gamma bias code based on the gamma voltage range;

a gamma bias controlling circuit configured to receive the gamma bias code and configured to output a gamma bias current code based on the gamma bias code; and a bias current outputting circuit configured to receive the gamma bias current code and configured to output a bias current based on the gamma bias current code.

2. The display apparatus of claim 1, wherein, based on the voltage level corresponding to the setting luminance of the gamma voltage range being higher than a voltage level of a reference luminance, a first bias current is applied to the gamma amplifying circuit.

3. The display apparatus of claim 2, wherein, based on the voltage level corresponding to the setting luminance of the gamma voltage range being lower than the voltage level of the reference luminance, a second bias current lower than the first bias current is applied to the gamma amplifying circuit.

4. The display apparatus of claim 2, wherein, based on the voltage level corresponding to the setting luminance of the gamma voltage range being a voltage level of a maximum luminance, a third bias current higher than the first bias current is applied to the gamma amplifying circuit.

5. The display apparatus of claim 1, wherein the bias current is updated on frame by frame.

6. The display apparatus of claim 5, wherein, based on the gamma voltage range of a present frame being wider than the gamma voltage range of a previous frame, the bias current of the present frame is higher than the bias current of the previous frame.

7. The display apparatus of claim 5, wherein, based on the gamma voltage range of a present frame being narrower than the gamma voltage range of a previous frame, the bias current of the present frame is lower than the bias current of the previous frame.

8. The display apparatus of claim 1, wherein the low gamma reference voltage is generated based on the setting luminance.

9. The display apparatus of claim 1, wherein the gamma amplifying circuit comprises a first gamma amplifier and a second gamma amplifier, wherein the gamma bias circuit comprises a first gamma bias circuit and a second gamma bias circuit, wherein a first amp bias current generated by the first gamma bias circuit is applied to the first gamma amplifier, wherein a second amp bias current generated by the second gamma bias circuit is applied to the second gamma amplifier and wherein the first amp bias current and the second amp bias current are different.

10. The display apparatus of claim 1, wherein the gamma amplifying circuit comprises a first gamma amplifier and a second gamma amplifier, wherein a first amp bias current generated based on the setting luminance and the gamma voltage range is applied to the first gamma amplifier, wherein a second amp bias current generated based on the setting luminance and the gamma voltage range is applied to the second gamma amplifier, and wherein the first amp bias current and the second amp bias current are different.

11. The display apparatus of claim 1, wherein the gamma reference voltage generator comprises a first gamma amplifying circuit configured to generate first gamma reference voltages corresponding to an image of a first color, a second gamma amplifying circuit configured to generate second gamma reference voltages corresponding to an image of a second color and a third gamma amplifying circuit configured to generate third gamma reference voltages corresponding to an image of a third color and wherein the first gamma amplifying circuit, the second gamma amplifying circuit and the third gamma amplifying circuit have different bias currents.

12. The display apparatus of claim 1, wherein the data driver and the gamma reference voltage generator are formed as an integrated data driver.

13. A method of driving a display panel, the method comprising:

outputting a gate signal to a display panel;

generating gamma reference voltages using a gamma reference voltage generator and a gamma bias circuit;

wherein generating gamma reference voltages comprises using a gamma voltage setting circuit configured to output a high gamma reference voltage and a low gamma reference voltage based on the input image data, and wherein using the gamma bias circuit comprises:

using a gamma bias setting circuit configured to output a gamma bias code based on the gamma voltage range;

using a gamma bias controlling circuit configured to receive the gamma bias code and configured to output a gamma bias current code based on the gamma bias code; and using a bias current outputting circuit configured to receive the gamma bias current code and configured to output a bias current based on the gamma bias current code;

and a gamma amplifying circuit configured to receive the bias current; and outputting a data voltage to the display panel based on input image data and the gamma reference voltages.

14. The method of claim 13, wherein based on a voltage level corresponding to the setting luminance of the gamma voltage range being higher than a voltage level of a reference luminance, applying a first bias current to the gamma amplifying circuit.

15. The method of claim 14, wherein based on the voltage level corresponding to the setting luminance of the gamma voltage range being lower than the voltage level of the reference luminance, applying a second bias current lower than the first bias current to the gamma amplifying circuit.

16. The method of claim 14, wherein based on the voltage level corresponding to the setting luminance of the gamma voltage range being a voltage level of a maximum luminance, applying a third bias current higher than the first bias current to the gamma amplifying circuit.

17. The method of claim 13, further comprising updating the bias current frame by frame.

18. The method of claim 17, wherein based on the gamma voltage range of a present frame being wider than the gamma voltage range of a previous frame, the bias current of the present frame is higher than the bias current of the previous frame.

19. The method of claim 17, wherein based on the gamma voltage range of a present frame being narrower than the gamma voltage range of a previous frame, the bias current of the present frame is lower than the bias current of the previous frame.

* * * * *